US012580101B1

(12) United States Patent
Maxwell et al.

(10) Patent No.: US 12,580,101 B1
(45) Date of Patent: \*Mar. 17, 2026

(54) JACKET MARKING AND SCORING SYSTEM AND METHOD

(71) Applicant: Encore Wire Corporation, McKinney, TX (US)

(72) Inventors: Ryan J. Maxwell, McKinney, TX (US); Kevin D. Rodgers, Roswell, NM (US)

(73) Assignee: Encore Wire Corporation, McKinney, TX (US)

( * ) Notice: Subject to any disclaimer, the term of this patent is extended or adjusted under 35 U.S.C. 154(b) by 107 days.

This patent is subject to a terminal disclaimer.

(21) Appl. No.: 18/747,925

(22) Filed: Jun. 19, 2024

Related U.S. Application Data

(63) Continuation of application No. 17/588,825, filed on Jan. 31, 2022, now Pat. No. 12,040,104.

(Continued)

(51) Int. Cl.
| | |
|---|---|
| *H01B 13/34* | (2006.01) |
| *B29C 48/00* | (2019.01) |
| *B29C 48/06* | (2019.01) |
| *B29C 48/154* | (2019.01) |
| *B29C 48/21* | (2019.01) |

(Continued)

(52) U.S. Cl.
CPC ....... *H01B 13/341* (2013.01); *B29C 48/0022* (2019.02); *B29C 48/06* (2019.02); *B29C 48/154* (2019.02); *B29C 48/21* (2019.02); *B29C 48/92* (2019.02); *H01B 13/14* (2013.01); *H01B 13/34* (2013.01); *B29C*

*2948/92295* (2019.02); *B29C 2948/92447* (2019.02); *B29C 2948/92561* (2019.02); *B29C 2948/92923* (2019.02); *B29K 2077/00* (2013.01); *B29K 2995/0005* (2013.01); *B29K 2995/0007* (2013.01); *B29L 2031/3462* (2013.01)

(58) Field of Classification Search
CPC ... B29C 59/021; B29C 59/022; B29C 59/043; H01B 13/34; H01B 13/341
See application file for complete search history.

(56) References Cited

U.S. PATENT DOCUMENTS

| | | | | | |
|---|---|---|---|---|---|
| 1,956,951 | A | * | 5/1934 | Hinsky | H01B 13/0009 101/6 |
| 2,344,610 | A | * | 3/1944 | Dunkerley | H01B 13/341 118/DIG. 21 |

(Continued)

FOREIGN PATENT DOCUMENTS

| | | | | | |
|---|---|---|---|---|---|
| DE | 2434281 | A | * | 1/1976 | G01B 5/043 |
| DE | 3105845 | A1 | * | 9/1982 | H01B 13/146 |

(Continued)

*Primary Examiner* — Atul P. Khare
(74) *Attorney, Agent, or Firm* — Warren Rhoades LLP

(57) ABSTRACT

An apparatus for marking and scoring an insulated wire or cable is disclosed. The apparatus includes a housing enclosing a portion of a wire path, wherein the insulated wire or cable moves along the wire path through the housing; an upper splined gear rod and a lower splined gear rod within the housing; an actuator connected to the upper splined gear rod, wherein the actuator raises and lowers the upper splined gear rod; and wherein the actuator when lowered presses the insulated wire or cable between the upper and lower splined gear rods.

20 Claims, 11 Drawing Sheets

Related U.S. Application Data

(60) Provisional application No. 63/143,889, filed on Jan. 31, 2021.

(51) Int. Cl.
| | |
|---|---|
| *B29C 48/92* | (2019.01) |
| *H01B 13/14* | (2006.01) |
| *B29K 77/00* | (2006.01) |
| *B29L 31/34* | (2006.01) |

(56) References Cited

U.S. PATENT DOCUMENTS

| | | | | |
|---|---|---|---|---|
| 3,650,862 A | * | 3/1972 | Burr ..................... | H01B 13/341 |
| | | | | 156/51 |
| 4,021,177 A | * | 5/1977 | Kaiser ................. | H01B 13/341 |
| | | | | 101/37 |
| 4,854,147 A | | 8/1989 | Buckwitz et al. | |

FOREIGN PATENT DOCUMENTS

| | | | | | |
|---|---|---|---|---|---|
| DE | 3120796 A | * | 12/1982 | .......... | H01B 13/341 |
| JP | 2009187905 | | 8/2009 | | |

* cited by examiner

JACKET MARKING AND SCORING SYSTEM AND METHOD

CROSS-REFERENCE TO RELATED APPLICATIONS

The subject application is a continuation of Ser. No. 17/588,825, filed Jan. 31, 2022, which claims priority to and benefit of U.S. Provisional Application Ser. No. 63/143,889, filed on Jan. 31, 2021, both of which are incorporated herein in their entirety by reference.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates to an apparatus, system, and method for marking and scoring a wire or cable. More specifically, it relates to apparatus, system, and method for marking or scoring a jacketed and/or insulated wire or cable to label the location of any defects or damage within the insulation of the wire or cable.

2. Description of Related Art

A wire or cable generally consists of one or more internal conductors, insulation surrounding one or more internal conductors, and optionally, a jacket that envelopes the one or more internal conductors and insulation. During the manufacturing process of a wire or cable, defects or damage to the insulation of the wire or cable may occur. For example, these defects or damage to the insulation of the wire or cable may include, but are not limited to, slicing, cracking, rupturing, insulation porosity, impurity inclusion, and pinhole defects. It is difficult to locate and label any insulation defects or damage that have occurred during manufacture while the line is running at high speeds. Once the jacket is extruded over the entire construction of the insulated wire or cable, it is even more difficult to locate and label any areas of insulation defects or damage that have occurred during manufacture while the line is running at high speeds. Without accurate labeling of the areas of defects or damage, removal of the damaged wire or cable is difficult. The importance of assuring all wire or cable that is delivered to customers meets every quality standard is one of the most important parts of any manufacturing process.

During the jacketing process in the wire and cable industry, a spark tester may be applied to each insulated conductor to assist in the identification of the locations containing defects or damage in the insulation prior to the jacket being extruded over the entire construction of the insulated wire or cable. In a prior art solution, a scoring device scores the jacket of the wire or cable at the location in which the spark tester detected a defect or damage in the insulation. This scoring device, however, routinely fails to score the wire or cable all together if the scoring device is not adjusted properly by the operator. This is because this system does not enclose any portion of the wire or cable to prevent the wire or cable from slipping off the scoring device or from being pushed aside from the scoring device, resulting in missed defects or damage within the insulation of the wire or cable being ultimately packaged and shipped to customers. This prior art system further relies on an operator to perform various manual operations during the jacketing process. These manual operations are labor intensive and are generally prone to human error, thereby creating many issues and inefficiencies during the jacketing process. For example, this system relies on the operator to maintain a continual visual inspection for each missed occurrence by the scoring device, requiring the operator to stop the jacket line to manually score the jacket at each location missed by the scoring device. This system fails when the operator loses the precise timing in which the spark tester detected a defect or damage in the insulation, resulting in longer lengths of cable were discarded to ensure the defect was removed.

A need exists for a marking and scoring apparatus, system, and method that surrounds at least a portion of the path of the jacketed wire or cable to improve the accuracy and consistency of the marking and scoring at the location of any defects or damage within the insulation of the wire or cable to ensure that these areas are accurately and consistently labeled for removal and to reduce the overall amount of wire discarded. Meeting this need would greatly increase the likelihood that all wire or cable delivered to customers meets every quality standard of the manufacturing process.

BRIEF SUMMARY OF THE INVENTION

The present disclosure is directed at an apparatus, system, and method that encloses at least a portion of the path of the jacketed and/or insulated wire or cable to accurately and consistently mark and score the jacketed and/or insulated wire or cable at the location of any defects or damage within the insulation of the wire or cable. Prior to the extrusion of a jacket over the entire construction of an insulated wire or cable, a spark tester, known in the art, is applied to each insulated conductor to identify any defects or damage to the insulation prior to the jacket extrusion process. Unlike the prior art, this system and method receives the wire or cable from the extrusion head and surrounds at least a portion of the wire or cable path, located after the extrusion head, to overcome the deficiencies of the prior art by preventing the wire or cable from slipping off and/or being pushed aside to ensure that the system and method does not fail to imprint the scoring marks at the location of any defects or damage within the insulation of the wire or cable. The apparatus, system, and method is activated by a signal from a timing device, known in the art, to score the jacketed and/or insulated wire or cable at the exact location where the spark tester detected a defect or damage to the insulation of the wire or cable.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

In the drawings.

DETAILED DESCRIPTION OF THE INVENTION

Figure 1A:
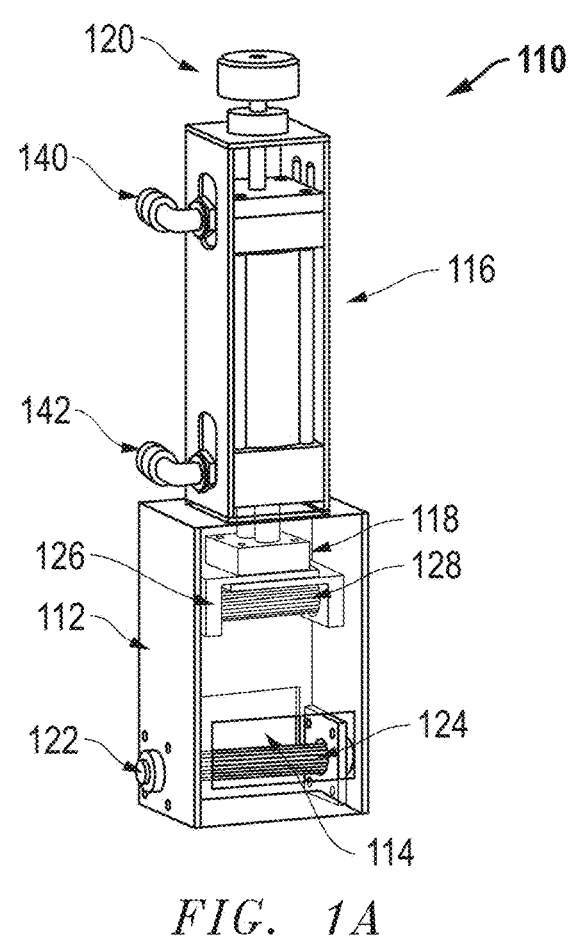
FIGS. 1A-1D illustrates the marking and scoring apparatus in accordance with an embodiment of the invention.

Before explaining at least one disclosed embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for purpose of description and should not be regarded as limiting.

It should be understood that any one of the features of the invention may be used separately or in combination with other features. Other systems, methods, features, and advantages of the present invention will be or become apparent to one with skill in the art upon examination of the drawings and the detailed description. It is intended that all such additional systems, methods, features, and advantages be included within this description, be within the scope of the present invention, and be protected by accompanying claims.

The present disclosure is described below with reference to the Figures in which various embodiments of the present invention are shown. The subject matter of the disclosure may, however, be embodied in many different forms and should not be construed as limited to the exemplary embodiments set forth herein. It is also understood that the term "wire" is not limiting, and refers to wires, cables, electrical lines, or any other materials that are dispensed from a reel.

The present disclosure provides for a system and method for improved marking and scoring the jacket of insulated wire or cable at the location of any defects or damage within the insulation of the wire or cable.

Referring now to FIGS. 1A-1D, 2A-2F, 3A-3B, 4A-4E, and 6, by way of non-limiting example, and consistent with embodiments of the invention, a marking and scoring apparatus or device 110 is shown. The marking and scoring apparatus 110 may be constructed from any number of materials that are able to withstand the pressures and demands placed upon it, including but not limited to metal. According to one embodiment shown in FIG. 1A, the marking and scoring apparatus 110 includes an offset roller assembly (housing) 112, a wire path 114, a linear actuator 116 containing an actuator arm 118, and a depth knob 120.

Figure 1B:
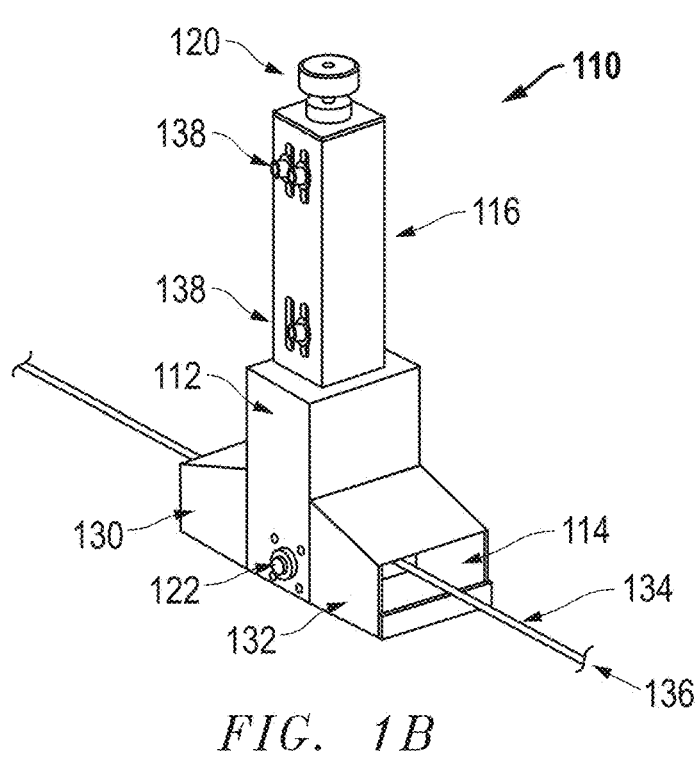
Figure 1C:
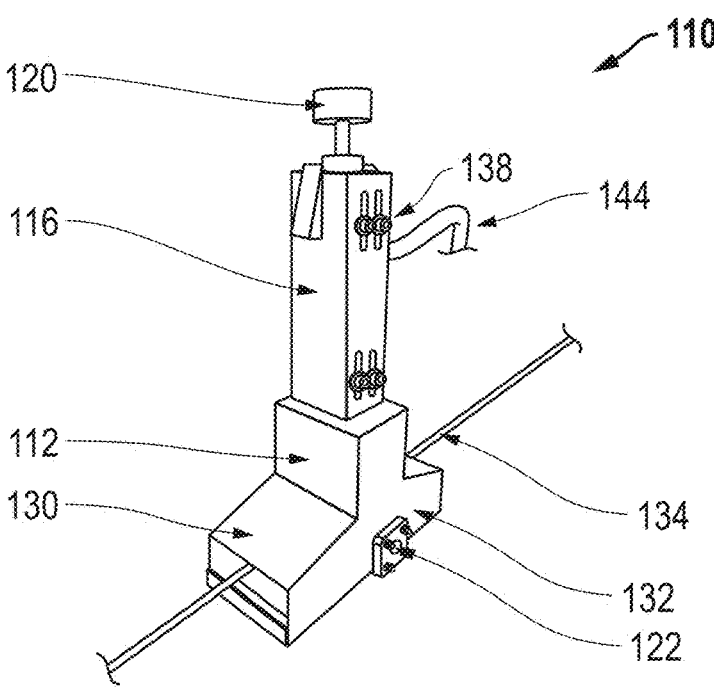
Figure 1D:
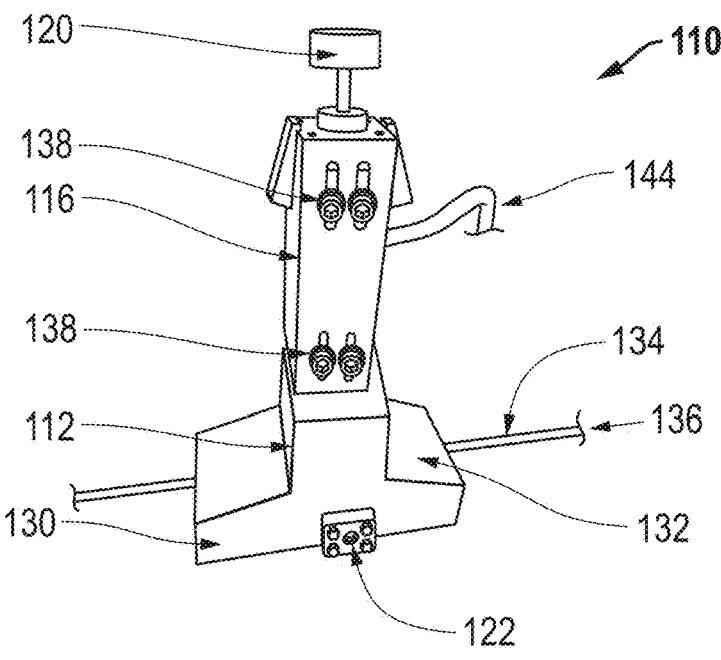
Figure 2A:
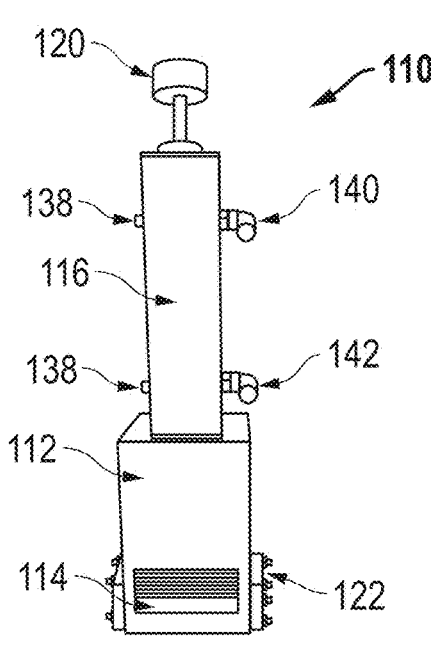
FIGS. 2A-2F are detailed views of an embodiment of the marking and scoring apparatus of FIG. 1.
Figure 2B:
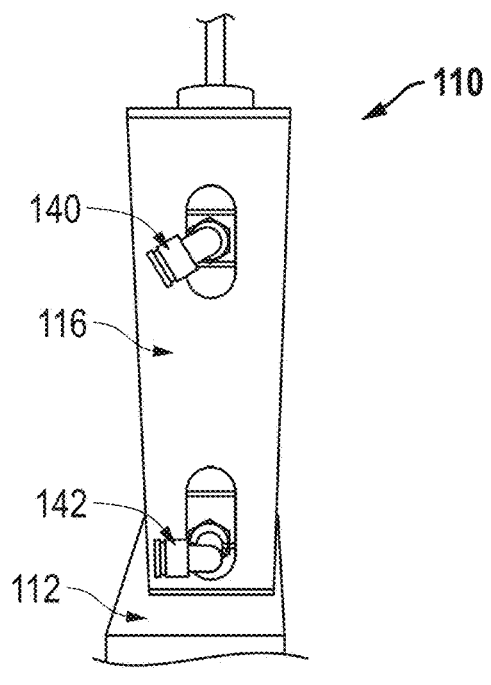
Figure 2C:
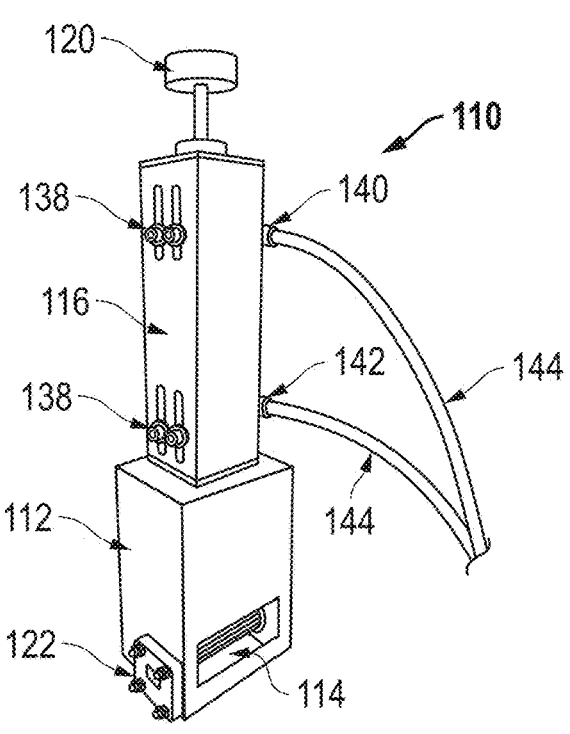
Figure 2D:
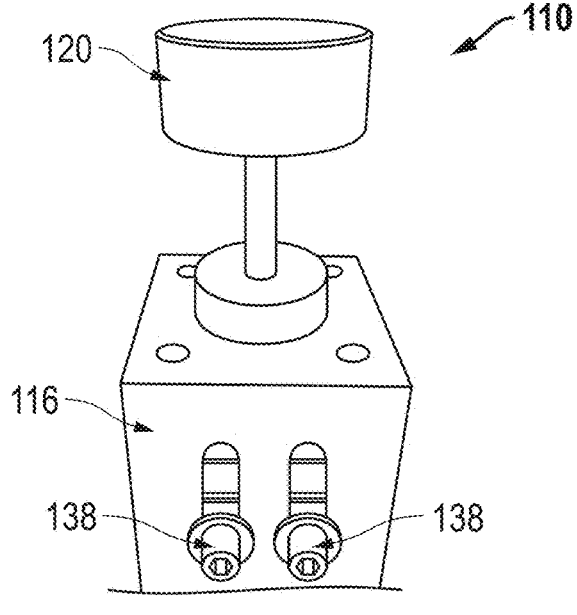
Figure 2E:
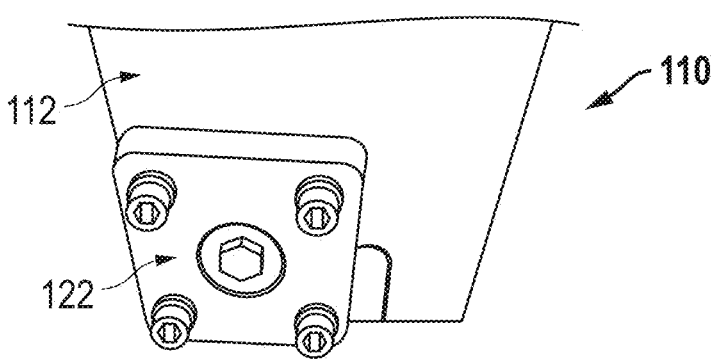
Figure 2F:
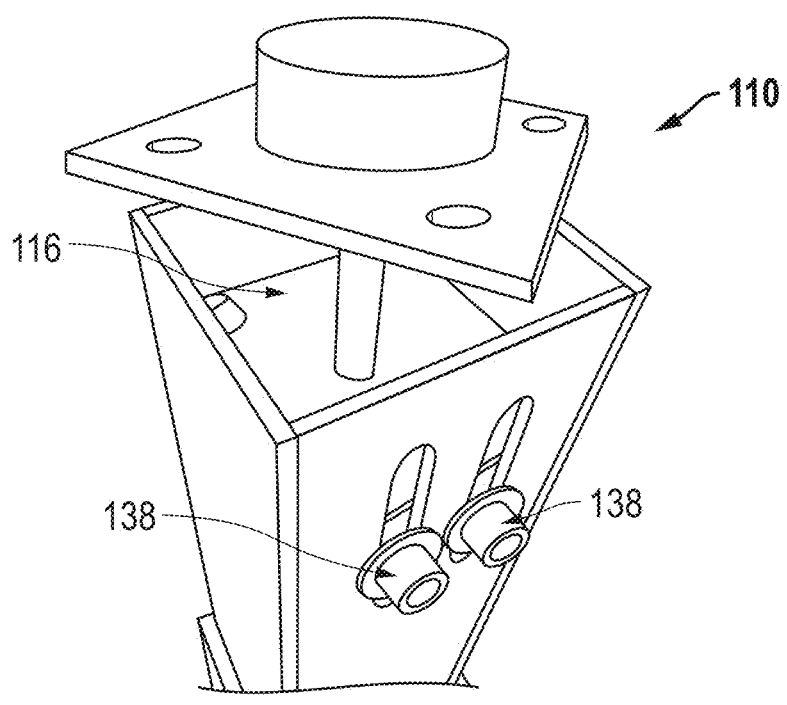

In one embodiment, the linear actuator 116 is a pneumatic double-cylinder linear actuator 116 coupled to the offset roller assembly (housing) 112 with mounting bolts 138. It should be understood that the double-cylinder linear actuator 116 may be coupled to the offset roller assembly (housing) 112 with mounting bolts 138 by a variety of mounts including, but not limited to, centerline mounts, fixed offset mounts, flange mounts, pivot mounts, foot mounts, trunnion mounts, and side mounts. In another embodiment, a single-cylinder linear actuator or a multiple-cylinder linear actuator may be used without detracting from the spirit of the invention. The offset roller assembly 112, in one embodiment, is in the shape of a rectangular box standing on its side with an open cavity. The front and rear sides of the offset roller assembly 112, are open and allow the wire or cable 136 to pass through the offset roller assembly 112 along the wire path 114. The top side of the offset roller assembly 112, has an opening to allow the linear actuator arm 118 to enter the cavity which is connected to a top actuated roller assembly 126 containing an upper splined gear rod 128. The upper splined gear rod 128 is rotationally connected to the top actuated roller assembly 126 and is free to spin when in contact with the wire or cable 136. The offset roller assembly 112 includes a bottom stationary roller assembly 122 containing a lower splined gear rod 124. The lower splined gear rod 124 is rotatably attached to the sides of the offset roller assembly 112. The two splined gear rods 124, 128 are replaceable and rebuildable. The pneumatic double-cylinder linear actuator 116 may be operated by a variety of elements including, but not limited to, air, gas, electrical, hydraulic, or any other element of operating an actuator. In this embodiment, the pneumatic double-cylinder linear actuator 116 includes a first and second port 140, 142 to supply and vent compressed air or gas through pneumatic hoses 144. In operation, the pressure in which the two splined gear rods 124, 128 of the offset roller assembly 112 come into contact with an insulated wire or cable 136, after a jacket 134 has been applied, may be adjusted by the operator via the depth knob 120 which can be rotated to adjust the penetration of the actuator arm 118 up and down depending on the desired pressure. The passage of the insulated wire or cable 136 through the marking and scoring apparatus 110 occurs after an insulative material has been applied to the bare wire conductors and, in some embodiments, after the jacket 134 has been applied to the wire or cable 136 and may occur when the jacket 134 is still hot from the extrusion or after the jacket 134 has cooled. The downward pressure of the actuator arm 118 forces the upper splined gear rod 128 down into contact with the wire or cable 136 which then forces the wire or cable 136 into contact with the lower splined gear rod 124. The marking and scoring apparatus 110 scores small grooves into the insulated wire or cable 136 and jacket 134 if present, exposing the bare wire conductors. The marking and scoring apparatus 110, located after the extrusion head, is timed to activate the scoring mechanism to score the wire or cable 136 at the point in which a tester 1104 detected a fault in the insulation of the wire or cable 136. As shown in FIGS. 1B-1D, the marking and scoring apparatus 110 also includes safety guards 130, 132 surrounding both the entry and exit of the wire path 114 for the wire or cable 136. The safety guards 130, 132 keep both the operator's hands and tooling away from pinch points of the marking and scoring apparatus 110 and for the safety of the line operator.

Prior to the extrusion of a jacket 134 over the insulated wire or cable 136, the tester 1104, known in the art, is applied to the insulated wire or cable 136 to identify any defects or damage to the insulated wire or cable 136. In one embodiment, the tester 1104 includes a spark tester 1104. The spark tester 1104 includes, but is not limited to, a high-voltage, a high frequency, an impulse, a direct current (DC) or an alternating current (AC) spark tester 1104. A spark tester 1104 generally consists of electrodes to generate an electrical field, an electrical cloud, or an ionization cloud within the test chamber of the spark tester 1104. For example, a high frequency, a direct current (DC), and an alternating current (AC) spark tester typically utilize a sturdy bead chain electrode to generate an electrical cloud or a ionization cloud within the test chamber of the spark tester 1104. It is known in the art that spark testers 1104 may utilize a variety of additional electrodes including, but not limited to, brush and spring electrodes, depending on the particular application of the spark tester 1104. To detect any defects or damage to the insulation, the insulated wire or cable 136 is pulled through the spark tester 1104 for contact with the electrodes of the spark tester 1104. This contact exposes the insulated wire or cable 136 to the electrical field within the test chamber of the spark tester 1104 that is generated by the selected test voltage being applied to its electrodes. If there is a defect or damage to the insulation of the wire or cable 136, this defect or damage to the insulation will cause a grounding of the electrical field generated by the spark tester 1104 and this flow of current is used to register an insulation fault by the spark tester 1104. It is known in the art that spark testers 1104 typically consist of an indication system, such as a digital counter, light signal, or acoustic alarm to indicate each individual defect or damage to the insulation of the wire or cable 136.

Figure 3A:
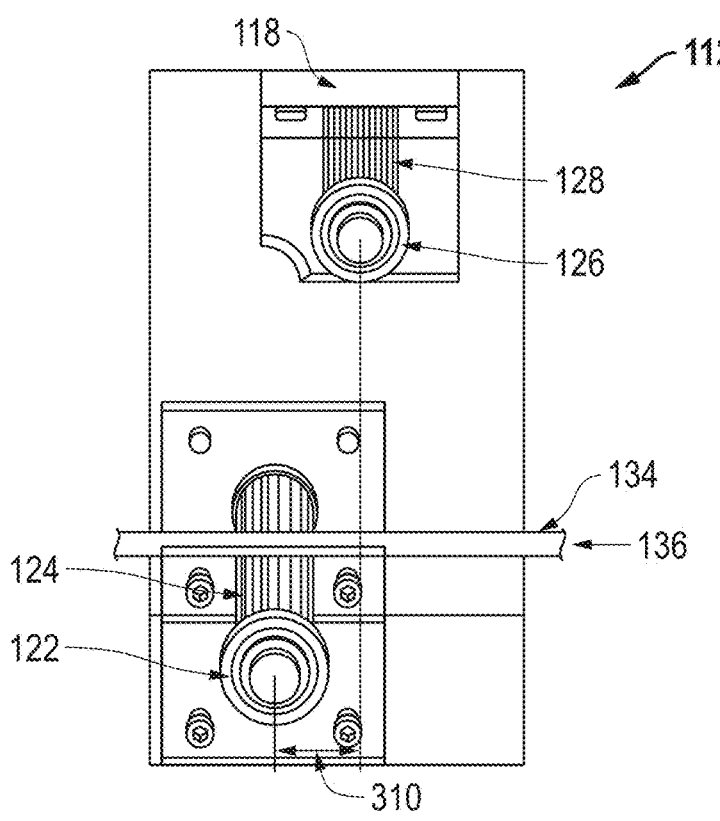
FIGS. 3A-3B are detailed views of an embodiment of an offset roller assembly in the non-engaged position of the marking and scoring apparatus of FIG. 1.
Figure 3B:
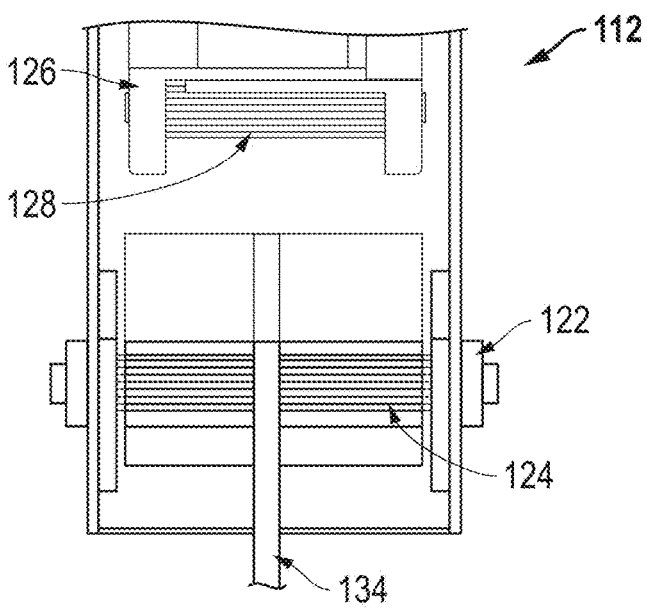

In one embodiment, the marking and scoring apparatus 110 is located after an extruder and the marking and scoring apparatus 110 is activated by a signal from a timing device 1110, known in the art, to score the insulated wire or cable 136 and the jacket 134, if present, at the exact location where the tester 1104 detected a defect or damage to the insulation of the wire or cable 136 prior to the jacket extrusion process, if present. The timing device 1110 accounts for the distance between the tester 1104 and the marking and scoring apparatus 110 as well as the speed of the wire or cable 136 as it travels through the marking and scoring apparatus 110 to ensure an accurate scoring of the areas of defect or damage. In this embodiment, the tester 1104, the timing device 1110, and the marking and scoring apparatus 110 are electronically connected to ensure an accurate scoring of the areas of defect or damage Referring now to FIGS. 3A-3B, the offset roller assembly 112 of the marking and scoring apparatus 110 in the non-engaged position is shown. As shown in FIG. 3A, the lower splined gear rod 124 is offset 310 from the upper splined gear rod 128. The offset splined gear rods 124, 128 reduce the pressure applied to the insulated wire and cable 136 and the jacket 134 if present, which reduces scraping and peeling off insulation and/or the jacket 134 rather than scoring of the jacketed and/or insulated wire or cable 136. The offset splined gear rods 124, 128 allow the jacketed and/or insulated wire or cable 136 to form around each roller, reducing a crushing impact from the upper splined gear rod 128. According to one embodiment, the jacketed and/or insulated wire or cable 136 is pulled from the extruder, known in the art, through the wire path 114 of the offset roller assembly (housing) 112 located between the bottom stationary roller assembly 122 and the top actuated roller assembly 126 of the marking and scoring apparatus 110. In one embodiment, the lower splined gear rod 124 extends across the cavity of the offset roller assembly 112 and perpendicular to the wire path 114. The top actuated roller assembly 126 extends across the cavity of the offset roller assembly 112 and perpendicular to the wire path 114. In this embodiment, the wire or cable 136 cannot avoid the offset splined gear rods 124, 128 when the actuator arm 118 forces the upper splined gear rod 128 down into contact with the wire or cable 136.

Referring now to FIGS. 1A-1D and 4A-4E, the offset roller assembly 112 of the marking and scoring apparatus 110 in the engaged position is shown. According to one embodiment, the actuator arm 118 of the pneumatic double-cylinder linear actuator 116 is activated by a signal from a timing device 1110 when the tester 1104 detects a defect or damage to the insulation of the wire or cable 136. When activated by a signal from a timing device 1110, the actuator arm 118 quickly travels in a downward motion to press the jacketed and/or insulated wire or cable 136 between the upper splined gear rod 128 of the top actuated roller assembly 126 and the lower splined gear rod 124 of the bottom stationary roller assembly 122. The force of the two splined gear rods 124, 128 of the offset roller assembly 112 pressing into the jacket and/or insulated wire or cable 136 imprint scoring marks 402 consistent with the two splined gear rod splines 124, 128 on both the top and the bottom of the wire or cable 136 as it travels at the line speed through the wire path 114 at the location in which the tester 1104 detected any defects or damage in the insulation. In one embodiment, the scoring of the jacketed and insulated wire or cable 136 occurs while the extruded jacket 134 is still hot. The extruded jacket 134 is at its highest temperature immediately after leaving the extrusion head. This is an advantage for the scoring process because the jacket 134 is the most elastic at this point making it easy to deform.

The design of the offset roller assembly (housing) 112 encloses at least a portion of the path 114 of the insulated wire or cable 136. In one embodiment, the offset roller assembly (housing) 112 comprises a confined wire path 114 that encloses at least a portion of the insulated wire or cable 136 as it travels through the marking and scoring apparatus 110 as shown in at least FIGS. 1A, 1B, 2A, 2C, 3B and 4A. The offset roller assembly (housing) 112 further comprises wide splined gear rods 124, 128 that also enclose at least a portion of the insulated wire or cable 136 as it travels through the marking and scoring apparatus 110 as shown in at least FIG. 3B. In this embodiment, both the lower splined gear rod 124 and the top actuated roller assembly 126, which includes the upper splined gear rod 128, extend horizontally and perpendicular across the entire confined wire path 114 of the offset roller assembly (housing) 112. The offset roller assembly 112 prevents the insulated wire or cable 136 from slipping off the marking and scoring apparatus 110 and from being pushed aside as the insulated wire or cable 136 travels through the offset roller assembly 112, to ensure that the marking and scoring apparatus 110 does not fail to imprint the scoring marks 402 consistent with the two splined gear rod splines 124, 128 into the jacket 134 and/or insulated wire or cable 136. The offset roller assembly 112 further eliminates the risk of applying too much downward pressure on the jacket 134 of the wire or cable 136 by the two splined gear rods 124, 128 of the offset roller assembly 112, which can crush the wire or cable 136, or cause the jacket 134 of the insulated wire or cable 136 to peel off rather than scoring it. Specifically, the offset roller assembly 112 allows the jacketed and insulated wire or cable 136 to form around the two splined gear rods 124, 128 of the offset roller assembly 112, thereby preventing any crushing impact on the wire or cable 136 as it travels through the wire path 114 as the upper and lower splined gear rods 124, 128 are offset 310 from each other. The wide splined gear rods 124, 128 within the offset roller assembly 112 allow for multiple jacketed wire or cable 136 sizes to be used.

Figure 4A:
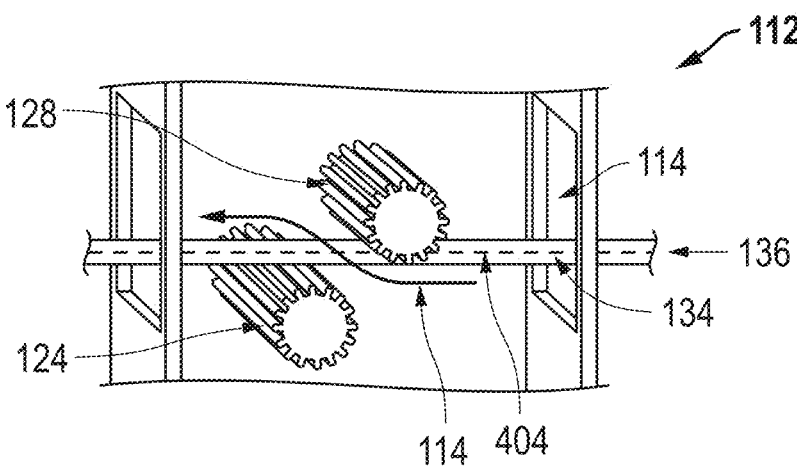
FIGS. 4A-4E are detailed views of an embodiment of an offset roller assembly in the engaged position of the marking and scoring apparatus of FIG. 1.
Figure 4B:
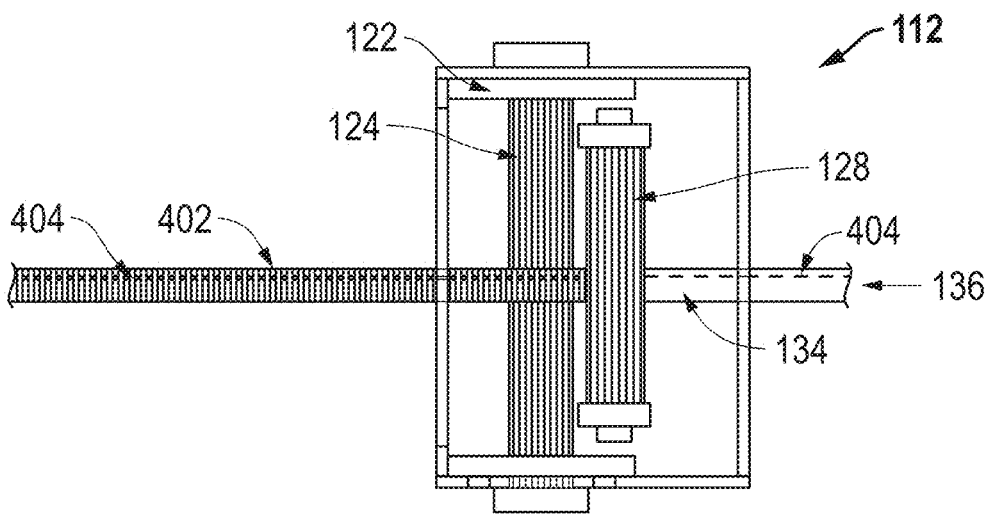
Figure 4C:
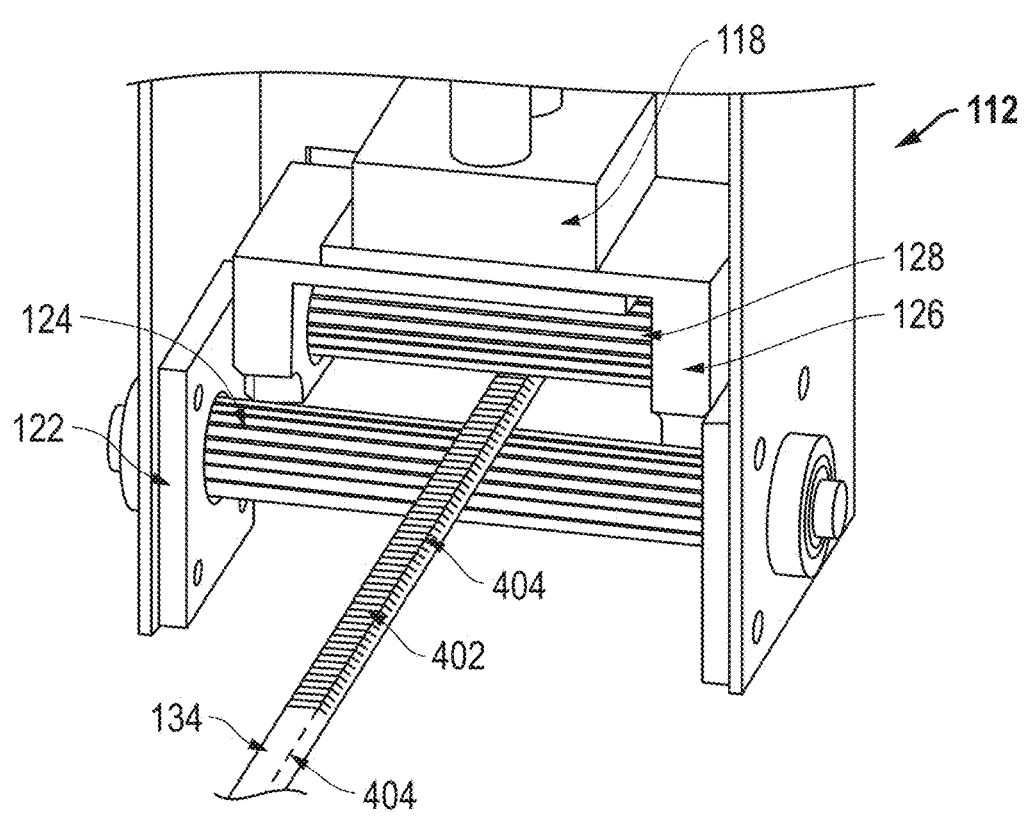
Figure 4D:
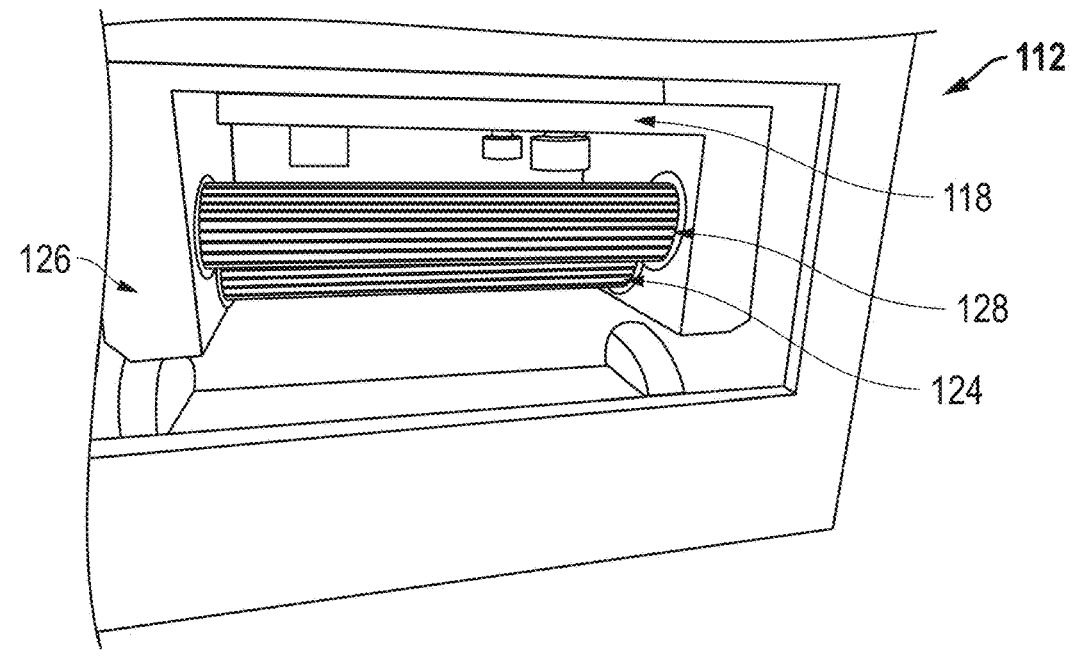
Figure 4E:
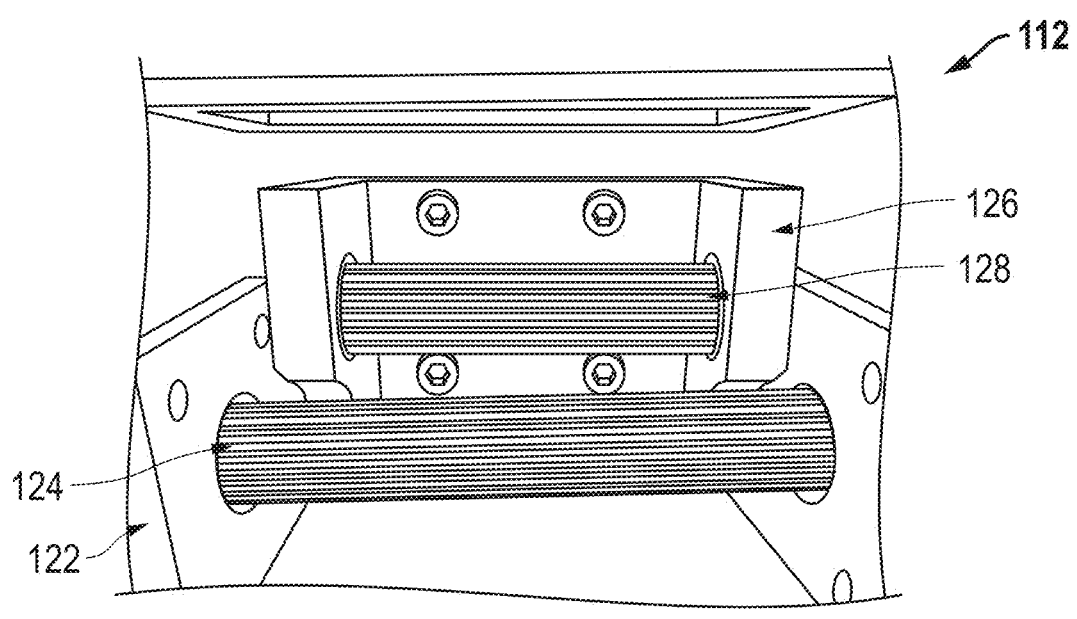
Figure 5:
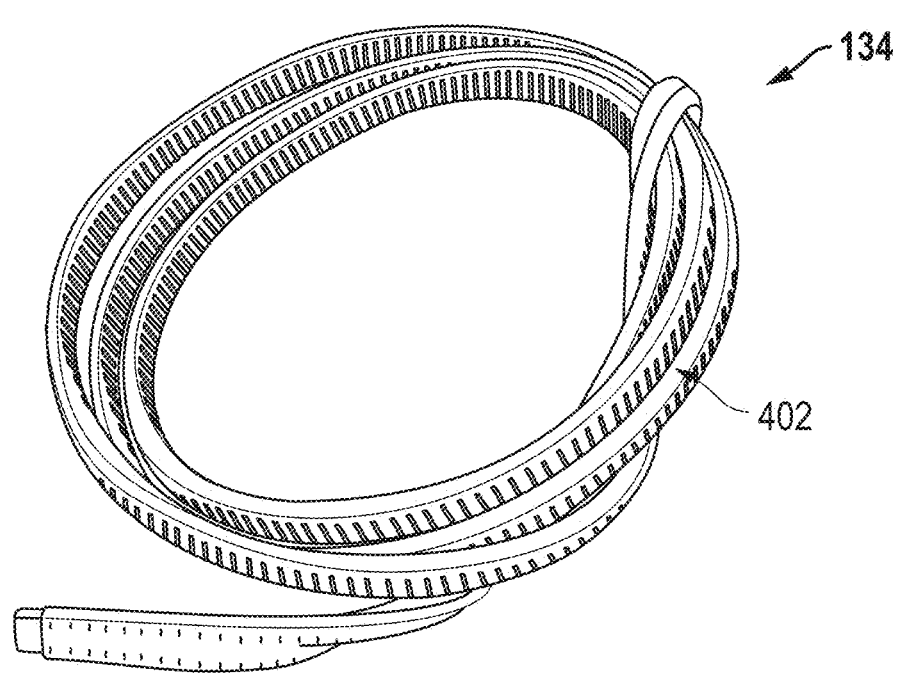
FIG. 5 illustrates an embodiment of the scoring marks created by the marking and scoring apparatus in accordance with an embodiment of the invention.

Referring now to FIGS. 4B, 4C, and 5, the scoring marks 402 of the jacket 134 and/or insulated wire or cable 136 containing the exposed bare internal conductors 404 are shown. These scoring marks 402 expose the bare internal conductors 404 within the construction of the jacket 134 and/or insulated wire or cable 136. The scoring marks 402 containing the exposed bare internal conductors 404 can be visually detected in any orientation by the operator to be discarded. In one embodiment, a second tester 1114 may be applied to the insulated wire or cable 136 at the end of the jacketing manufacturing process, to further locate the defective section of the insulated wire or cable 136 to be discarded. This second tester 1114 enhances a failsafe method to detect a jacket 134 of the insulated wire or cable 136 containing scoring marks 402 because a defect, such as a pinhole defect, is difficult to continually identify as the wire or cable 136 travels through the manufacturing process.

This apparatus, system, and method is independent of the operator's ability to manually score the wire or cable at each location missed by the scoring device. The apparatus, system, and method further allow the wire or cable line to continue running even after a fault is detected, increasing the overall machine efficiency. Additionally, this apparatus, system, and method improves the accuracy and consistency of the marking and scoring at the location of any defects or damage within the insulation of the wire or cable to ensure that these areas are accurately and consistently labeled for removal and reduces the overall amount of wire discarded.

Figure 6:
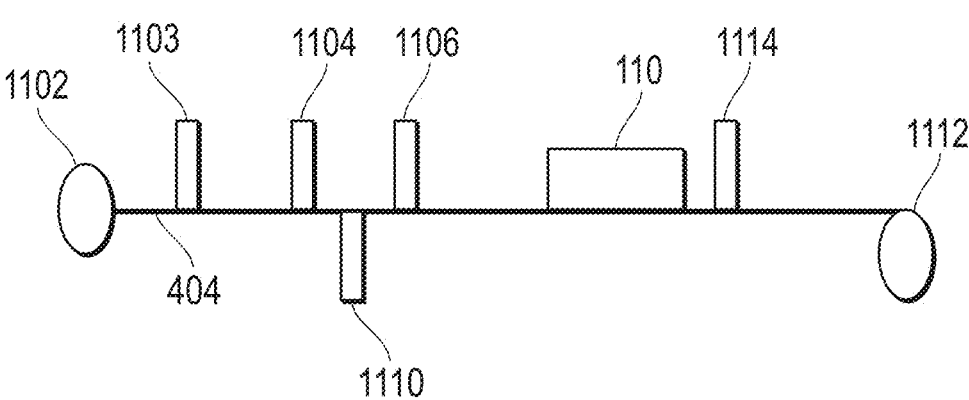
FIG. 6 is a diagram illustrating a system for manufacture of wire or cable in accordance with an embodiment of the present disclosure.

Referring now to FIG. 6, a diagram illustrating system for manufacture of wire or cable is depicted in accordance with one embodiment of the present disclosure. In this embodiment, a standard payoff reel 1102 to supply an internal conductor(s) 404, such as a copper or aluminum wire, is provided in system 1100. The standard payoff reel 1102 supplies the internal conductor(s) 404 to an extruder 1103 to apply an insulating material over the internal conductor(s) 404. Extruder 1103 may be a single extruder head, a plurality of extruders, a cross head, a co-extrusion head or any combination thereof. The insulating material may be thermoset, thermoplastic, elastomeric, polymeric dielectric or a semiconductor compound or any combination thereof.

A tester 1104 is provided in system 1100 to detect defects or damages in the insulation material over the internal conductor(s) 404. As discussed herein, the tester 1104 may include a spark tester 1104 including a high-voltage, a high frequency, an impulse, a direct current (DC) or a alternating current (AC) spark tester spark tester. The tester 1104 signals a timing device 1110 of the defect or damage to the insulated wire or cable 136. The timing device 1110 is set or programed to delay a specific amount of time before sending a signal to the marking and scoring apparatus 110 to score the jacketed and/or insulated wire or cable 136. The amount of time of the delay by the timing device 1110 is determined by the distance between the tester 1104 and the marking and scoring apparatus 110 and the speed of the wire or cable 136 as it moves along the wire path 114. After the tester 1104 and before the marking and scoring apparatus 110, a second extruder 1106 is provided in the system 1100. The second extruder 1106 applies a further additional layer of material including, but not limited to Nylon, thermoset, thermoplastic, elastomeric, polymeric dielectric or a semiconductor compound or any combination thereof.

In one embodiment, after the jacketed and insulated wire or cable 136 has been scored by the marking and scoring apparatus 110, a second tester 1114 is provided in system 1100 to detect defects or damages in the scored wire or cable 136. This second tester 1114 enhances the method of detecting defects by identifying the scoring marks 402 of the wire or cable 136. The scored sections of the jacketed and/or insulated wire or cable 136 are then removed from the final wire or cable product. A reel 1112 is provided to wind up the resulting final wire or cable product.

Figure 7:
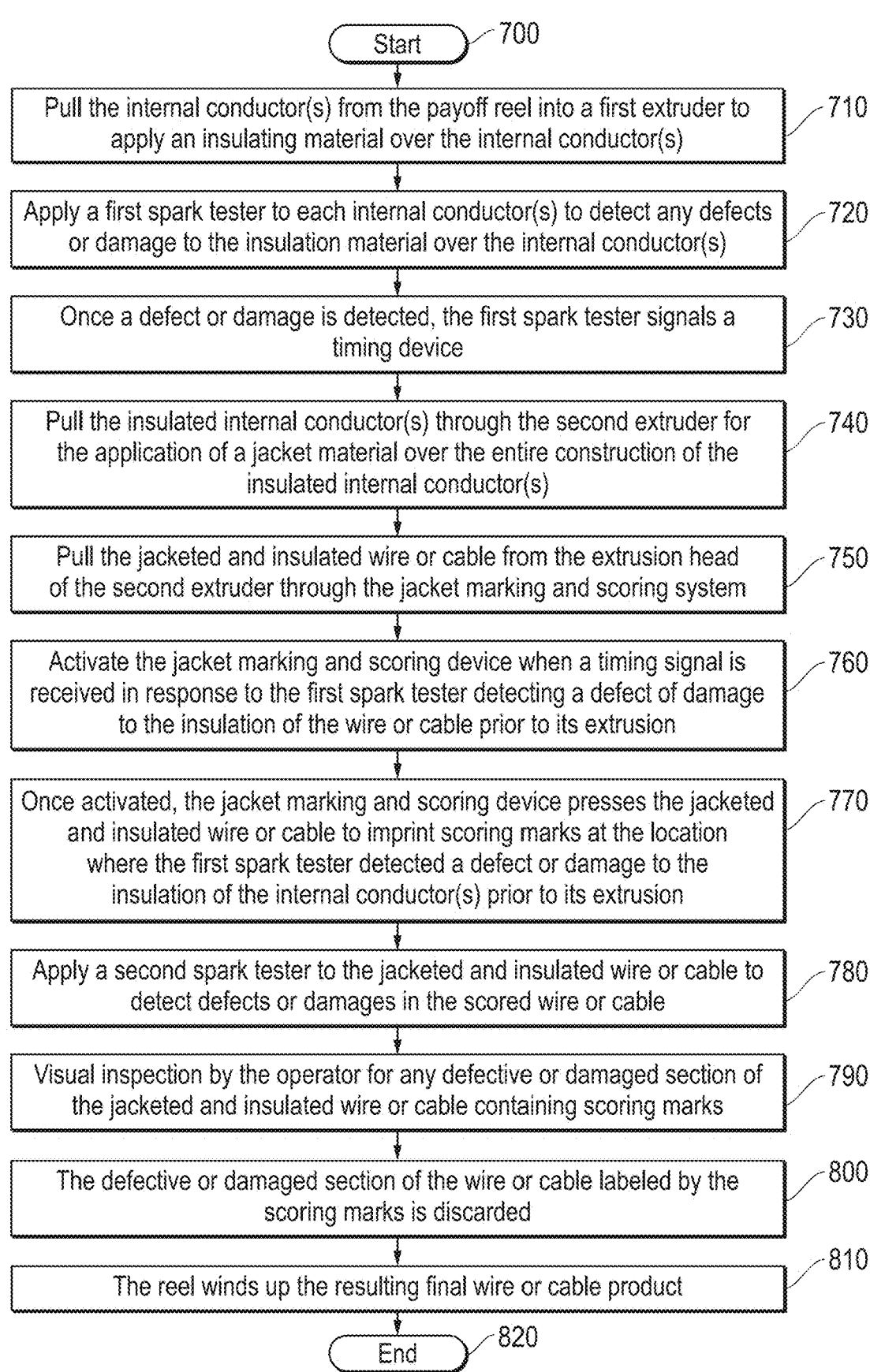
FIG. 7 depicts a flow chart of the jacket marking and scoring method in accordance with one embodiment of the present invention.

Referring now to FIG. 7, a flow chart of the jacket marking and scoring method is shown. The method begins with Start 700. Next, in step 710, the internal conductor(s) 404 is supplied from a payoff reel 1102 to an extruder 1103 to apply an insulating material over the internal conductor(s) 404. Next, in step 720, the first spark tester 1104 is applied to each internal conductor(s) 404 to detect any defects or damage to the insulation material over the internal conductor(s) 404 prior to the jacket 134 extrusion process of the insulated internal conductor(s) 404. Next, in step 730, when the spark tester 1104 detects a defect or damage to the insulation of the wire or cable 136, the spark tester 1104 signals a timing device 1110, of the defect or damage to the insulated wire or cable 136. The timing device 1110 is set or programed to delay a specific amount of time before sending a signal to the jacket marking and scoring apparatus 110 to score the jacketed and insulated wire or cable 136. The amount of time of the delay by the timing device 1110 is determined by the distance between the spark tester 1104 and the jacket marking and scoring apparatus 110 and the speed of the wire or cable 136 as it moves along the wire path 114. Next in in step 740, the insulated internal conductor(s) 404 is pulled through the second extruder 1106 for the application of a jacket 134 material over the insulated internal conductor(s) 404 to form the jacketed and insulated wire or cable 136. Next in in step 750, the jacketed and insulated wire or cable 136 is pulled from the second extruder 1106 through the wire path 114 of the offset roller assembly (housing) 112 located between the bottom stationary roller assembly 122 and the top actuated roller assembly 126. Next, in step 760, the jacket marking and scoring apparatus 110 is activated by a signal from the timing device 1110 in response from the spark tester 1104 detecting a defect or damage to the insulated internal conductor(s) 404 prior to the jacket extrusion process. Next, in step 770, once activated by the signal from the timing device 1110, the actuator arm 118 quickly travels in a downward motion to press the jacketed and insulated wire or cable 136 between the upper splined gear rod 128 of the top actuated roller assembly 126 and the lower splined gear rod 124 of the bottom stationary roller assembly 122. As the jacketed and insulated wire or cable 136 travels through the wire path 114, the force of the two splined gear rods 124, 128 of the offset roller assembly 112 pressing into the hot extruded jacket and insulation of the wire or cable 134 imprint scoring marks 402 consistent with the two splined gear rod splines 124, 128 on the top and the bottom of the jacket 134 of the wire or cable 136 at the location at which the spark tester 1104 detected any defects or damage in the insulation. The adjustment of scoring depth of the scoring marks 402 is performed by increasing or decreasing the pressure in which the upper and lower splined gear rods 124, 128 come into contact with the jacketed and insulated wire or cable 136 via the depth knob 120 by the operator.

Next, in step 780, the second spark tester 1104 is applied to the jacketed and insulated wire or cable 136 to detect defects or damages in the scored wire or cable 136. Next in step 790, the operator visually inspects for any defective or damaged section of the jacketed and insulated wire or cable 136 containing scoring marks 402. Next in step 800, the defective or damaged section of the jacketed and insulated wire or cable 136 containing scoring marks 402 is discarded from the final wire or cable product. The defective or damaged section of the jacketed and insulated wire or cable 136 containing scoring marks 402 may be discarded manually or automatically. In step 810, the reel 1112 winds up the resulting final wire or cable product. The method ends 820.

Although the invention is described herein with reference to specific embodiments, various modifications and changes can be made without departing from the scope of the invention as set forth in the claims below. Accordingly, the specification and figures are to be regarded in an illustrative rather than a restrictive sense, and all such modifications are intended to be included within the scope of the invention. Any benefits, advantages, or solutions to problems that are described herein with regard to specific embodiments are not intended to be construed as a critical, required, or essential feature or element of any or all the claims.

From time-to-time, the invention is described herein in terms of these example embodiments. Description in terms of these embodiments is provided to allow the various features and embodiments of the invention to be portrayed in the context of an exemplary application. After reading this description, it will become apparent to one of ordinary skill in the art how the invention can be implemented in different and alternative environments. Unless defined otherwise, all technical and scientific terms used herein have the same meaning as is commonly understood by one of ordinary skill in the art to which this invention belongs.

The preceding discussion is presented to enable a person skilled in the art to make and use the invention. The general principles described herein may be applied to embodiments and applications other than those detailed below without departing from the spirit and scope of the invention as defined by the appended claims. The invention is not intended to be limited to the embodiments shown, but is to be accorded the widest scope consistent with the principles and features disclosed herein.

In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

The various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one", "one or more" or the like; and adjectives such as "conventional", "traditional", "normal", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more", "at least", "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Unless stated otherwise, terms such as "first" and "second" are used to arbitrarily distinguish between the elements such terms describe. Thus, these terms are not necessarily intended to indicate temporal or other prioritization of such elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the field or any related fields are intended to be within the scope of the following claims.

What is claimed is:

1. An apparatus for marking and scoring an insulated wire or cable, the apparatus comprising:

an upper splined gear rod offset along a wire path for the insulated wire or cable from a lower splined gear rod; and an actuator connected to the upper splined gear rod, wherein the actuator is configured to raise and lower the upper splined gear rod;

wherein the upper splined gear rod when lowered by the actuator is configured to press the insulated wire or cable between the offset upper and lower splined gear rods to perform said marking and scoring respectively on a top and bottom of the insulated wire or cable.

2. The apparatus of claim 1, wherein the upper splined gear rod and the lower splined gear rod extend horizontally and perpendicular to the wire path.

3. The apparatus of claim 1, wherein the upper splined gear rod when lowered causes the insulated wire or cable to form around a portion of both the upper splined gear rod and the lower splined gear rod.

4. The apparatus of claim 1, wherein the actuator is a pneumatic double-cylinder linear actuator.

5. The apparatus of claim 4 further comprising an actuator arm connecting the pneumatic double-cylinder linear actuator to the upper splined gear rod.

6. The apparatus of claim 1 further comprising a depth knob connected to the actuator.

7. The apparatus of claim 6, wherein the depth knob adjusts downward pressure of the actuator and the upper splined gear rod on the insulated wire or cable.

8. A method of scoring a jacketed and insulated wire or cable, the method comprising the steps of:

pulling a jacketed and insulated wire or cable along a wire path comprising an upper splined gear rod connected to an actuator and offset from a lower splined gear rod along the wire path; and activating the actuator to lower the upper splined gear rod relative to the jacketed and insulated wire or cable so as to imprint scoring marks by the upper and lower splined gear rods respectively on a top and bottom of the jacketed and insulated wire or cable.

9. The method of claim 8, wherein the step of lowering the upper splined gear rod connected to the actuator further comprises pressing the jacketed and insulated wire or cable between the upper splined gear rod and the lower splined gear rod.

10. The method of claim 9, wherein the step of imprinting scoring marks is performed on a jacket of the jacketed and insulated wire or cable so as to form the scoring marks consistent with the splines of the upper splined gear rod and the lower splined gear rod.

11. The method of claim 8, wherein the step of imprinting scoring marks is performed on a jacket of the jacketed and insulated wire or cable so as to expose at least one internal conductor of the jacketed and insulated wire or cable.

12. The method of claim 8, wherein the scoring marks designate the location of a defect or damage within the jacketed and insulated wire or cable.

13. The method of claim 8, wherein the scoring marks form a scored portion of the jacketed and insulated wire or cable, further comprising the step of discarding the scored portion of the jacketed and insulated wire or cable.

14. The method of claim 13, wherein the step of discarding the scored portion of the jacketed and insulated wire or cable comprises automatically discarding the scored portion of the jacketed and insulated wire or cable.

15. A jacketed and insulated wire or cable manufacturing system, the system comprising:

a first extruder, wherein the first extruder applies an insulating material on an internal conductor;

a tester in contact with the insulated internal conductor, wherein the tester determines defects or damage to the insulated internal conductor;

a timing device connected to the tester; and a marking and scoring apparatus downstream of the tester and electronically connected to the tester, the marking and scoring apparatus further comprising:

an upper splined gear rod offset along a wire path for the insulated internal conductor from a lower splined gear rod; and an actuator connected to the upper splined gear rod, wherein the actuator is configured to raise and lower the upper splined gear rod relative to the insulated internal conductor in response to a signal received from the tester;

wherein the upper splined gear rod when lowered by the actuator is configured to press the insulated internal conductor between the offset upper and lower splined gear rods to perform said marking and scoring respectively on a top and bottom of the insulated internal conductor.

16. The system of claim 15, wherein the tester comprises a spark tester.

17. The system of claim 15, wherein the timing device causes a delay for a set period of time before the signal is sent to the actuator.

18. The system of claim 17, wherein the timing device delay is determined based upon the distance from the tester to the marking and scoring apparatus and is based upon a rate of travel of the insulated internal conductor.

19. The system of claim 15 further comprising a second extruder downstream from the tester, the second extruder applying a jacketing material to the insulated internal conductor.

20. The system of claim 19, wherein the jacketing material forms a Nylon jacket on the insulated internal conductor.

* * * * *